US011218638B2

(12) United States Patent
Sato et al.

(10) Patent No.: US 11,218,638 B2
(45) Date of Patent: Jan. 4, 2022

(54) IMAGING CONTROL APPARATUS AND METHOD OF CONTROLLING IMAGING CONTROL APPARATUS

(71) Applicant: CANON KABUSHIKI KAISHA, Tokyo (JP)

(72) Inventors: Ayumi Sato, Kawasaki (JP); Tomohiro Ota, Nagi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/998,386

(22) Filed: Aug. 20, 2020

(65) Prior Publication Data
US 2021/0058554 A1 Feb. 25, 2021

(30) Foreign Application Priority Data

Aug. 23, 2019 (JP) .............. JP2019-152835

(51) Int. Cl.
H04N 5/232 (2006.01)
G06F 3/0488 (2013.01)

(52) U.S. Cl.
CPC ..... *H04N 5/23293* (2013.01); *G06F 3/04886* (2013.01); *H04N 5/23216* (2013.01); *H04N 5/23245* (2013.01); *G06F 2203/04804* (2013.01)

(58) Field of Classification Search
CPC ........... H04N 5/23293; H04N 5/23216; H04N 5/23245; H04N 5/232939; H04N 5/232941; G06F 3/04886; G06F 3/0484; G06F 2203/04804; G06F 2203/04886

USPC ..................................................... 348/333.01
See application file for complete search history.

(56) References Cited

U.S. PATENT DOCUMENTS

| 10,158,806 | B2* | 12/2018 | Salimpour | ......... H04N 5/23216 |
| 10,802,683 | B1* | 10/2020 | Griffin | .................... H04L 67/24 |
| 10,937,247 | B1* | 3/2021 | Chuah | ................. G01C 21/3848 |
| 2005/0044500 | A1* | 2/2005 | Orimoto | ................... G06F 9/453 |
| | | | | 715/706 |
| 2010/0045570 | A1* | 2/2010 | Takata | ................... G06F 3/0481 |
| | | | | 345/4 |
| 2012/0047437 | A1* | 2/2012 | Chan | ................ H04N 21/47217 |
| | | | | 715/720 |

(Continued)

FOREIGN PATENT DOCUMENTS

JP 2013-162412 A 8/2013

*Primary Examiner* — Pritham D Prabhakher
(74) *Attorney, Agent, or Firm* — Cowan, Liebowitz & Latman, P.C.

(57) ABSTRACT

An imaging control apparatus includes a setting unit configured to set, in accordance with user operation, whether transparent display at a first transparency level is performed for a display element that is superimposed and displayed on a captured image captured by an imaging unit; a display control unit configured to superimpose and display a plurality of display elements including a specific display element on the captured image, and to control so that in a case where the setting unit sets the transparent display to be performed, the plurality of display elements other than the specific display element are transparently superimposed and displayed on the captured image at the first transparency level, and the specific display element is superimposed and displayed on the captured image at a second transparency level lower than the first transparency level.

14 Claims, 13 Drawing Sheets

(56) References Cited

U.S. PATENT DOCUMENTS

| | | | |
|---|---|---|---|
| 2017/0064208 A1* | 3/2017 | Salimpour | H04N 5/232935 |
| 2018/0061104 A1* | 3/2018 | Vange | G06F 3/0482 |
| 2018/0198984 A1* | 7/2018 | Palma | G11B 27/105 |
| 2019/0050132 A1* | 2/2019 | Rawlings | G06F 3/03545 |
| 2019/0147026 A1* | 5/2019 | Jon | G06F 3/04886 |
| | | | 715/230 |

* cited by examiner

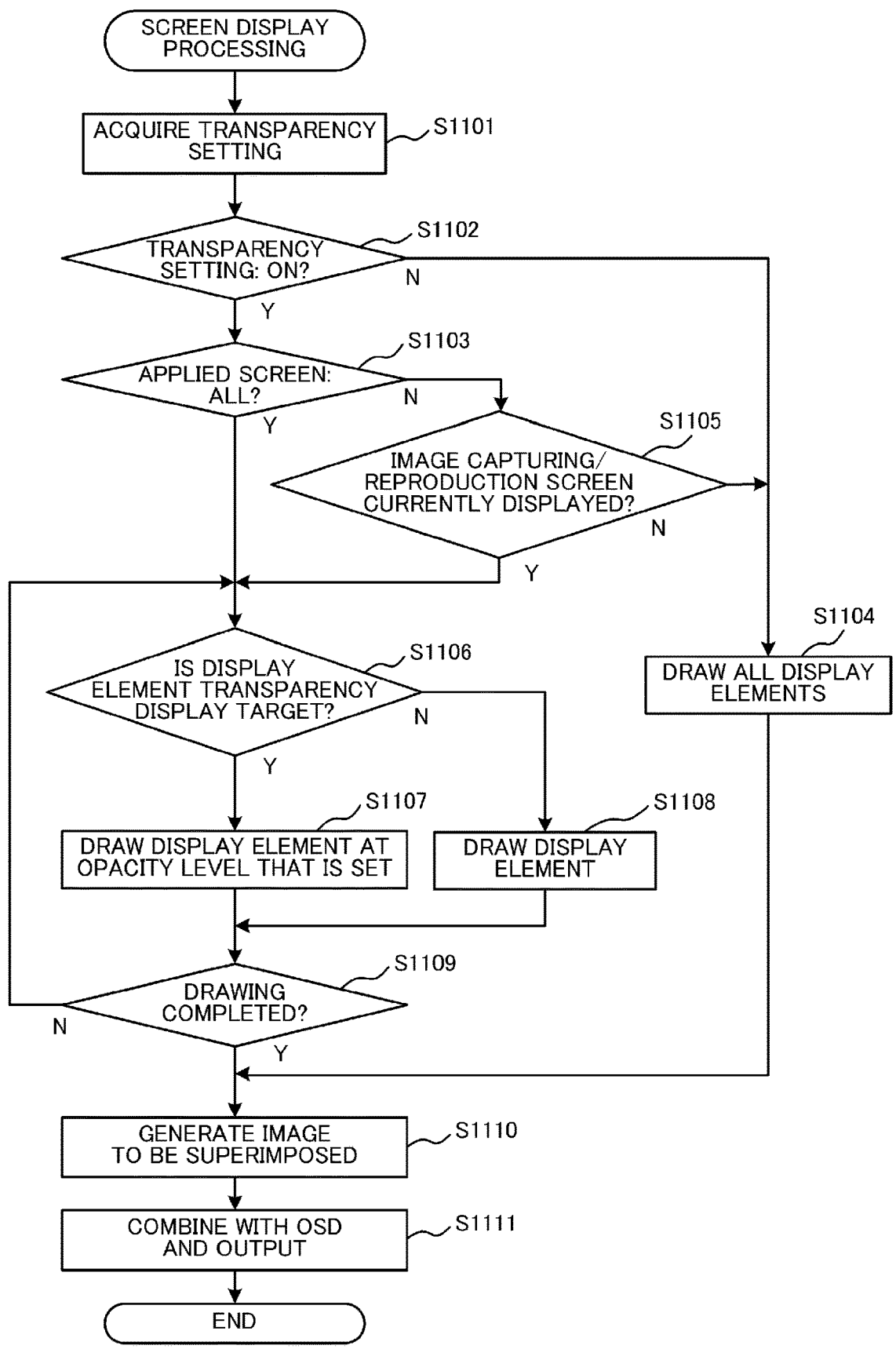

ically using US 11,218,638 B2

IMAGING CONTROL APPARATUS AND METHOD OF CONTROLLING IMAGING CONTROL APPARATUS

BACKGROUND OF THE INVENTION

Field of the Invention

The present invention relates to an imaging control apparatus, a method of controlling the imaging control apparatus, a program, and a recording medium.

Description of the Related Art

In recent years, a function for the user to set the transparent display for an on-screen display (OSD) is known. This function is used to decrease the brightness of the OSD when an image is being captured in a dark scene, or to prevent the OSD from interrupting an image capture (Japanese Patent Application Publication No. 2013-162412).

In Japanese Patent Application Publication No. 2013-162412, a user can increase the transparency level of the OSD in order to view a live view (LV) image more clearly.

However, unfortunately in this case, the display elements which should be seen clearly are displayed transparently and cannot be viewed clearly because a predetermined transparency level is used for throughout the OSD.

SUMMARY OF THE INVENTION

It is an object of the present invention to provide an imaging control apparatus whereby, when display elements are displayed transparently, the visibility of a display element which should be seen clearly is maintained.

To solve this problem, an imaging control apparatus of the present invention includes: a setting unit configured to set, in accordance with user operation, whether transparent display at a first transparency level is performed for a display element that is superimposed and displayed on a captured image captured by an imaging unit; a display control unit configured to superimpose and display a plurality of display elements including a specific display element on the captured image, and to control so that in a case where the setting unit sets the transparent display to be performed, the plurality of display elements other than the specific display element are transparently superimposed and displayed on the captured image at the first transparency level, and the specific display element is superimposed and displayed on the captured image at a second transparency level lower than the first transparency level.

Further features of the present invention will become apparent from the following description of exemplary embodiments with reference to the attached drawings.

BRIEF DESCRIPTION OF THE DRAWINGS

FIG. 11 is a flow chart exemplifying screen display processing;

DESCRIPTION OF THE EMBODIMENTS

Embodiment

Figure 1:
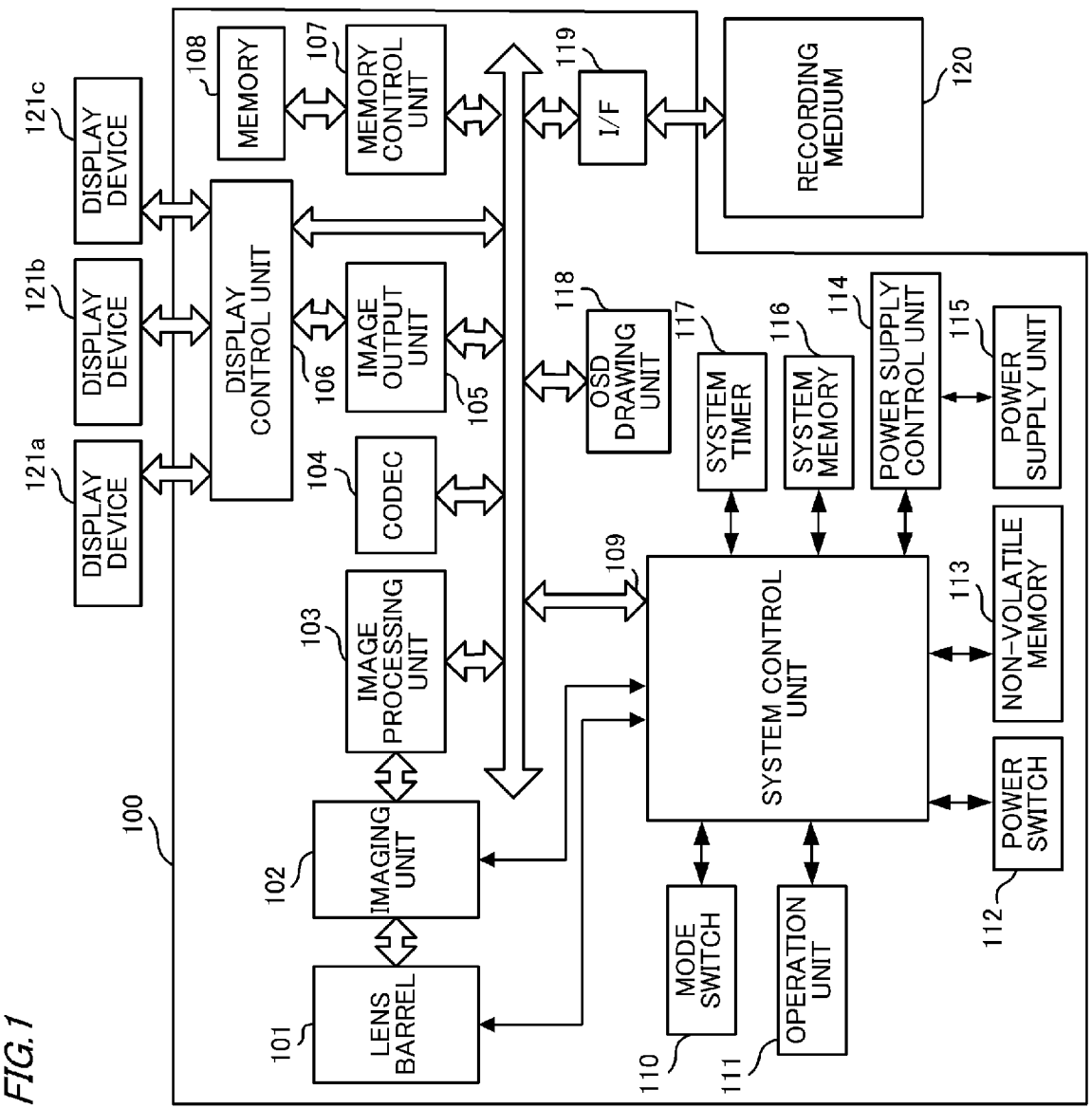
FIG. 1 is a block diagram depicting an example of a configuration of a digital video camera.

A preferred embodiment of the present invention will be described with reference to the drawings. FIG. 1 indicates a configuration example of a digital video camera 100, which is an example of an imaging control apparatus to which the present invention is applicable. FIG. 1 is a block diagram depicting an example of a configuration of the digital video camera 100.

The digital video camera 100 has a case in which most of the composing elements of the digital video camera 100 are enclosed. A lens barrel 101 includes a focus lens, an imaging lens (e.g. vibration isolation lens) and an aperture. The lens barrel 101 may be integrated with or separated from the case.

An imaging unit 102 includes an imaging sensor that converts an optical image, focused on by the imaging lens of the lens barrel 101, into electric signals, and an A/D convertor that converts analog signals into digital signals. A video processing unit 103 performs predetermined resize processing, trimming processing, color conversion processing and distortion correction processing on video data from the imaging unit 102, or video data acquired from a memory control unit 107, so as to generate VRAM data. The video processing unit 103 writes the generated VRAM data to a memory 108 via the memory control unit 107. The video processing unit 103 also performs predetermined arithmetic processing using captured video data. The predetermined arithmetic processing includes a function to detect an object (e.g. face), for example. A system control unit 109 performs exposure control, distance measurement control and vibration isolation processing based on the acquired arithmetic result. Thereby auto focus (AF) processing, automatic exposure (AE) processing and vibration isolation processing are performed. Further, the video processing unit 103 can perform predetermined arithmetic processing using the captured video data, and perform auto white balance (AWB) processing based on the acquired arithmetic result. Furthermore, the video processing unit 103 can perform resize processing and color conversion processing on the VRAM data generated by a CODEC 104 decoding encoded video data, so as to generate new VRAM data.

The CODEC 104 encodes the VRAM data, which is generated by the video processing unit 103, by MPEG2 or by such a video compression system as H.264. The CODEC 104 also decodes the encoded video data acquired from the memory control unit 107, and transfers the decoded data to the memory control unit 107 as the VRAM data.

A video output unit 105 reads a plurality of VRAM data stored in the memory 108 via the memory control unit 107. The video output unit 105 generates video signals so that the VRAM data on the on-screen display (OSD), which was read, is superimposed on the VRAM data of the video image at a ratio in accordance with the transparent components. The system control unit 109 can also assign the meta data, determined by the system control unit 109, to the generated video signals.

A display control unit 106 establishes connection with display devices 121a to 121c, and outputs the video signals. The digital video camera 100 is connected to the display devices 121a to 121c by cable respectively, but may be connected by another method, wireless for example. The display device 121a is an external display device connected to a video terminal (video output terminal) via a connection cable. The display device 121b is an external display device connected to an HDMI® output terminal via an HDMI cable. The digital video camera 100 can exchange video signals and signal standard information with the display device 121b connected with the HDMI cable. The display device 121c is an electronic view finder (EVF). The external EVF unit is used in this embodiment, but may be an internal EVF. Besides the display devices 121a to 121c, video signals may be outputted to an internal display panel or a display device connected via a wireless technology, such as wireless LAN. The display devices 121a to 121c will be collectively called "display device 121" herein below.

The memory control unit 107 has a function to receive an access request from each block to the memory 108, and to arbitrate the reading and writing of the data. The memory 108 stores the VRAM data handled by the video processing unit 103, the CODEC 104, the video output unit 105 and the OSD drawing unit 118. The memory 108 also temporarily stores encoded video data outputted from the CODEC 104 and the encoded video data read from the recording medium 120. The memory 108 has a recording capacity that is sufficient to store a predetermined time of moving images and sounds.

The system control unit 109 is a control unit constituted of at least one processor and/or circuit, and controls the digital video camera 100 in general. The system control unit 109 controls each unit by reading and executing programs recorded in a volatile memory 113, so as to implement each processing of this embodiment, to be described later. The system control unit 109 may include a plurality of CPU cores. The system control unit 109 can process a task written in a program using a plurality of CPU cores.

A mode switch 110 is a switch to select a mode of the digital video camera 100. The mode switch 110 determines a mode out of an image capturing mode, reproduction mode and the like in accordance with the position of the switch, and notifies the determined mode to the system control unit 109.

An operation unit 111 is an operation unit to input various processing instructions to the system control unit 109. The operation unit 111 includes a menu button, a cancel button, a four-direction key (which can be pressed in the upper, lower, left or right direction), and a SET button. The operation unit 111 also includes buttons to switch various functions (e.g. AF/MF), a REC button to instruct the start/stop of recording, and an assign button to assign a function in the menu setting. For example, when the menu button is pressed, a menu screen, to perform various settings, is displayed on the display device 121 that is connected to the digital video camera 100. While viewing the menu screen displayed on the display device 121, the user intuitively performs various settings using the four-direction key and the SET button. A power switch 112 is a button to switch the power of the digital video camera 100 ON/OFF.

The non-volatile memory 113 is a memory which is electrically erasable and recordable, such as EEPROM. In the non-volatile memory 113, constants and programs for operating the system control unit 109 are stored. "Programs" here refers to programs for executing various flow charts, which will be described later in this embodiment.

A power supply control unit 114 includes a battery detection circuit, a DC-DC convertor, and switch circuits to switch blocks to be energized, and detects whether a battery is installed, the type of battery, and the residual amount of battery power. The power supply control unit 114 also controls the DC-DC convertor based on the detection result and the instruction from the system control unit 109, and supplies the required voltage to each unit, including the recording medium 120, for a required period of time. A power supply unit 115 is constituted of a primary battery (e.g. alkali battery, lithium battery), a secondary battery (e.g. NiCd battery, NiMH battery, Li battery), and AC adaptor and the like.

A system memory 116 is RAM, for example. The system control unit 109 develops, in the system memory 116, the constants and variables for operating the system control unit 109, and the programs read from the non-volatile memory 113. The system control unit 109 also controls display by controlling the memory 108, the OSD drawing unit 118, and the video output unit 105. The system memory 116 may be the same as the memory 108. In the case where the system memory 116 is the same as the memory 108, the system memory 116 is accessed via the memory control unit 107, hence the system control unit 109 may directly connect to a separate small capacity memory at high-speed. A system timer 117 is a clock unit to measure the time used for various controls and the time of the internal clock.

The OSD drawing unit 118 renders the character strings to indicate the state and settings of the digital video camera 100, icons, various frames and markers to the VRAM data on the memory 108. The character strings and icons are stored in the non-volatile memory 113. The OSD drawing unit 118 reads the character strings and icons from the non-volatile memory 113, and renders the character strings and icons to the VRAM data. The VRAM data on the memory 108 includes transparency level components, and can be rendered at a desired transparency level for each pixel.

An IF 119 is an interface with a recording medium 120, such as a memory card and hard disk. The IF 119 records the encoded video data stored in the memory 108 in the recording medium 120. Further, the IF 119 reads the encoded video data and attached data recorded in the recording medium 120, and transfers this data to the memory 108. The recording medium 120 may be a memory card, a hard disk drive or a disk installed in the digital video camera 100, or may be a flash memory or hard disk drive embedded in the digital video camera 100.

Figure 2:
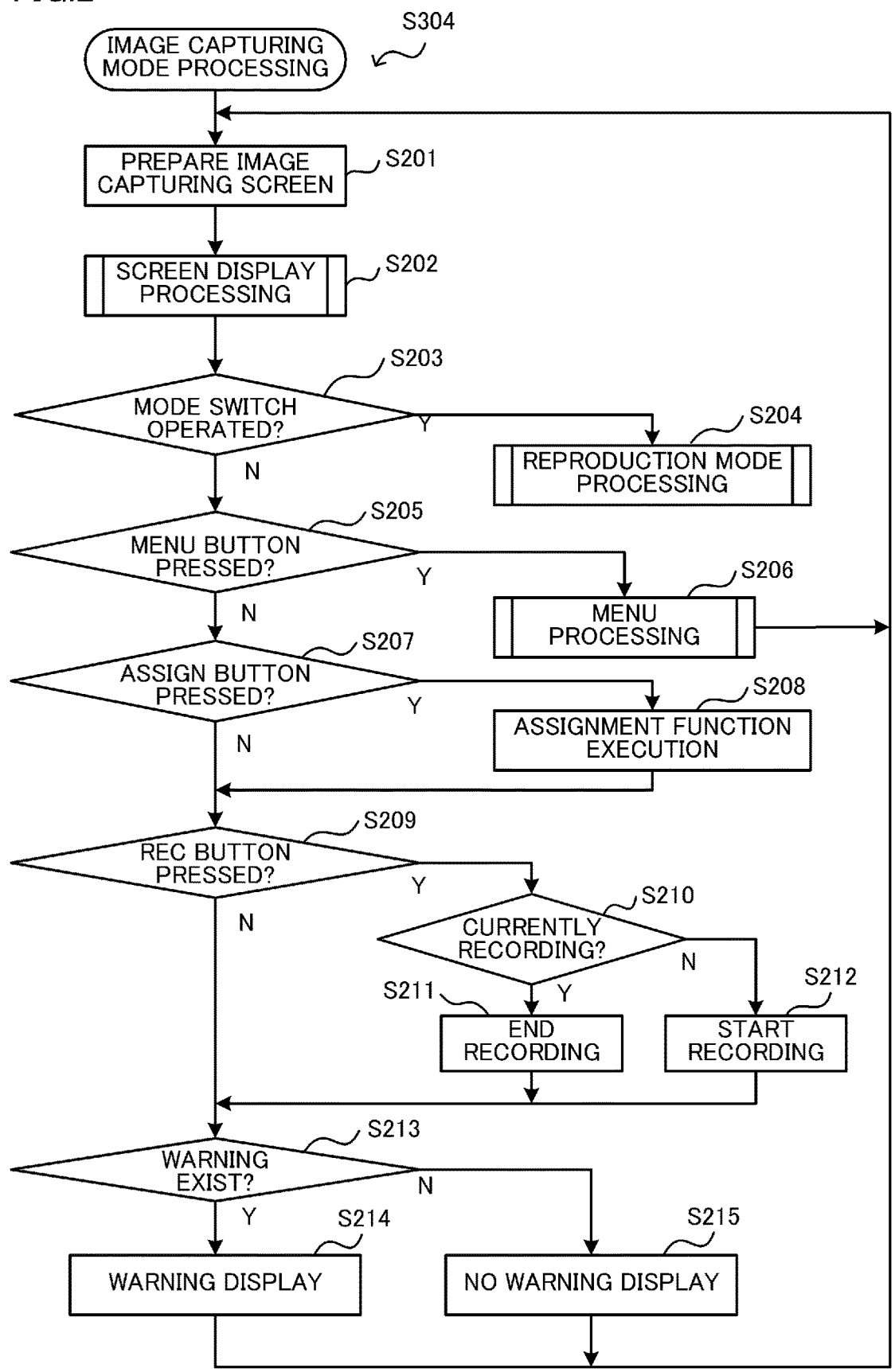
FIG. 2 is a flow chart exemplifying image capturing mode processing of the digital video camera.

Processing of digital video camera Image capturing mode processing FIG. 2 is a flow chart exemplifying the image capturing mode processing of the digital video camera 100. FIG. 2 exemplifies the flow of the processing that is performed in response to the operation received from the user (user operation) in the image capturing mode. Each processing in the flow chart is implemented by the system control unit 109 developing, in the system memory 116, a program which is stored in the non-volatile memory 113, and executing the program.

In S201, the system control unit 109 performs preparation processing to display an image capturing screen. In concrete terms, for each display element which is superimposed and displayed on a live view (LV) image, which is an image captured by the imaging unit 102, on the display device 121, the system control unit 109 sets whether the display element is a transparency control target in the OSD transparence setting. Here it is predetermined, in the OSD transparency setting, whether or not each display element is a transparency control target, and this information is stored in the non-volatile memory 113. However, this information can be set by the user.

The system control unit 109 sets a display element that indicates the recording state of an image (captured image), a display element of which image is masked, and a display element that indicates a warning, for example, to display elements that are not transparency control targets in the OSD transparency setting. The display element that indicates the recording state of an image is, for example, the recording state 1201 in FIG. 12A. The display element of which image is masked is, for example, the mask 1205 of the aspect marker in FIG. 12E. And the display element that indicates a warning is, for example, the warning display 1204 in FIG. 12C.

In S202, the system control unit 109 executes screen display processing. The screen display processing will be described in detail later with reference to FIG. 11. In the processing in S202, the system control unit 109 displays one of the screens of FIG. 12A to FIG. 12F on the display devices 121a to 121c.

Figure 12A:
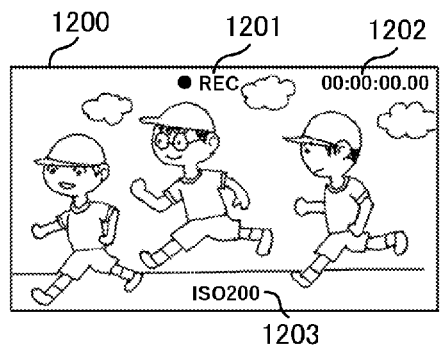
FIG. 12A to FIG. 12F are display examples of an image capturing screen.
Figure 12B:
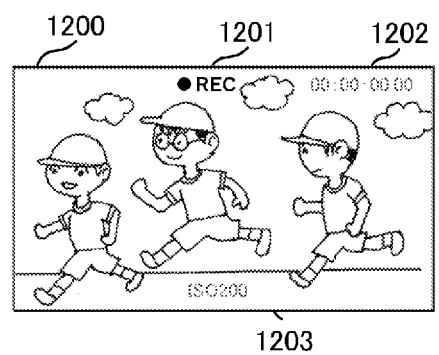

FIG. 12A and FIG. 12B are both display examples of the image capturing screen. FIG. 12A is a display example when the OSD transparency is not applied, and FIG. 12B is a display example when the OSD transparency is applied. In both examples of FIG. 12A and FIG. 12B, the display elements of the recording state 1201, the time code 1202 and the ISO sensitivity 1203 are displayed on the image capturing screen 1200, so as to be superimposed on the LV image. In the examples in FIG. 12A and FIG. 12B, the recording state 1201 is displayed as an REC icon, which indicates whether a moving image is in the recording state or stopping state, the time code 1202 is displayed as information on the recording time of the moving image, and the ISO sensitivity 1203 is displayed as an icon that indicates the image capturing setting.

In FIG. 12A, the display elements of the recording state 1201, the time code 1202 and the ISO sensitivity 1203 are superimposed and displayed on the LV image without transparency. In FIG. 12B, however, the time code 1202 and the ISO sensitivity 1203 are transparently displayed at the transparency level (first transparency level) which is set by the user in the later mentioned processing in FIG. 6, while the OSD transparency is not applied to the recording state 1201, so that the user can see the OSD clearly. The first transparency level is a transparency level that is set in according with the user operation, and is also referred to as the "specific transparency level". Specifically, the specific transparency level is a transparency level to display the display elements with no transparency, or transparently display at a transparency level that is lower than the transparency level set by the user. In any case, the display elements are superimposed and displayed on the LV image without being transparent to the transparency level set by the user. Thereby the user can more easily see the LV image, since the time code 1202 and the ISO sensitivity 1203 are transparently displayed, however the recording state can be clearly seen, which prevents the user from forgetting to stop image capturing, for example.

Figure 12C:
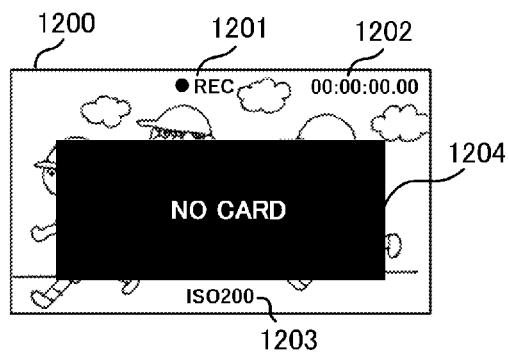
Figure 12D:
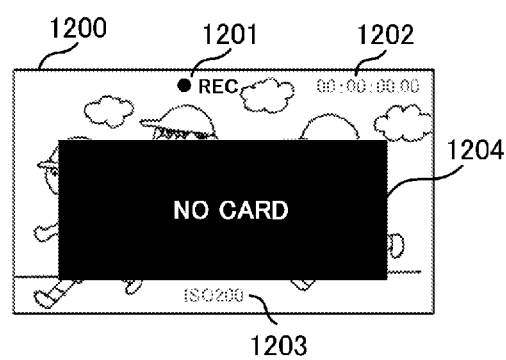

FIG. 12C and FIG. 12D are both display examples in the case where the warning display is superimposed on the image capturing screen. FIG. 12C is a display example when the OSD transparency is not applied, and FIG. 12D is a display example when the OSD transparency is applied. In both examples of FIG. 12C and FIG. 12D, the display elements of the recording state 1201, the time code 1202, the ISO sensitivity 1203 and the warning display 1204 are displayed on the image capturing screen 1200, so as to be superimposed on the LV image. In the example of FIG. 12C, the display elements of the recording state 1201, the time code 1202, the ISO sensitivity 1203 and the warning display 1204 are displayed on the image capturing screen 1200 without transparency, so as to be superimposed on the LV image. In FIG. 12D, however, the time code 1202 and the ISO sensitivity 1203 are transparently displayed at the transparency level (first transparency level) which is set by the user in the later mentioned processing in FIG. 6, while the OSD transparency is not applied to the recording state 1201 and the warning display 1204. Therefore the recording state 1201 and the warning display 1204 are displayed so that the user can easily see them. In other words, these display elements are displayed with no transparency, or are transparently displayed at a transparency level that is lower than the transparency level set by the user. In any case, the display elements are superimposed and displayed on the LV image without being transparent to the transparency level set by the user. Thereby the system control unit 109 notifies the warning content indicated by the warning display 1204 such that the user can recognize the warning with high certainty.

Figure 12E:
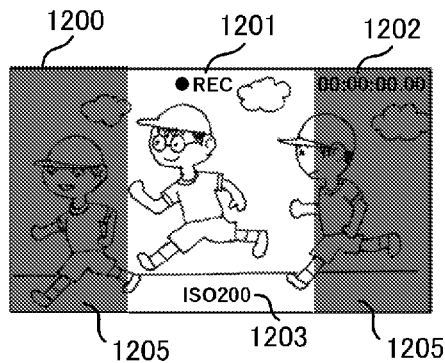
Figure 12F:
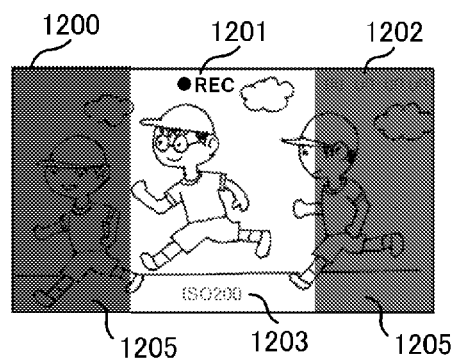

FIG. 12E and FIG. 12F are both display examples in the case where a mask of the image is superimposed and displayed on the image capturing screen. FIG. 12E is a display example when the OSD transparency is not applied, and FIG. 12F is a display example when the OSD transparency is applied. In both examples of FIG. 12E and FIG. 12F, the display elements of the recording state 1201, the time code 1202, the ISO sensitivity 1203 and the mask of the aspect marker 1205 (which is set in the later mentioned FIG. 8) are displayed on the image capturing screen 1200, so as to be superimposed on the LV image. In the example of FIG. 12E, the display elements of the recording state 1201, the time code 1202, the ISO sensitivity 1203 and the mask of the aspect marker 1205 are displayed on the image capturing screen 1200 with no transparency, so as to be superimposed on the LV image. In FIG. 12F, however, the time code 1202 and the ISO sensitivity 1203 are transparently displayed at the transparency level (first transparency level) which is set by the user in the later mentioned processing in FIG. 6, while the OSD transparency is not applied to the recording state 1201 and the mask of the aspect marker 1205. Therefore the recording state 1201 and the mask of the aspect marker 1205 are displayed so that the user can easily see them. In other words, the recording state 1201 is displayed with no transparency, or is transparently displayed at a transparency level that is lower than the transparency level set by the user. In any case, the display element is superimposed and displayed on the LV image without being transparent to the transparency level set by the user. The mask of the aspect marker 1205 is superimposed and displayed on the LV image at a specific transparency level, regardless the transparency level (first transparency level) set by the user in the later mentioned processing n FIG. 6. In other words, the transparency level of the mask of the aspect marker 1205 is the same in the case of FIG. 12E where the OSD transparency is not applied, and the case of FIG. 12F where the OSD transparency is applied. In the case where the first transparency level is set to a transparency level which is higher than a specific transparency level predetermined as the transparency level of the mask of the aspect marker 1205, the mask of the aspect marker 1205 is superimposed and displayed on the LV image at a transparency level that is lower than the first transparency level.

In S203, the system control unit 109 determines whether the user operates the mode switch 110. Processing advances to S204 if the mode switch 110 is operated and the mode changed to the reproduction mode, or to S205 if the mode switch 110 is not operated.

In S204, the system control unit 109 switches the operation state of the digital video camera 100 to the reproduction mode, and executes the reproduction mode processing. The reproduction mode processing will be described in detail later with reference to FIG. 3.

In S205, the system control unit 109 determines whether the user presses the menu button of the operation unit 111. If the menu button is pressed, the system control unit 109 displays the menu screen on the display device 121, and processing advances to S206. If the menu button is not pressed, the system control unit 109 advances the processing to S207.

In S206, the system control unit 109 executes the menu processing, and then returns processing to S201. The menu processing includes processing corresponding to each menu item displayed on the menu screen. The system control unit 109 executes the processing of the menu item which the user selected in the menu screen. The menu processing will be described in detail later with reference to FIG. 4 to FIG. 10.

In S207, the system control unit 109 determines whether the user presses the assign button which is included in the operation unit 111. Processing advances to S208 if the assign button is pressed, or to S209 if not pressed.

In S208, the system control unit 109 executes the function assigned to the assign button. If the function assigned to the assign button is "OSD transparency setting: VIDEO terminal", the system control unit 109 displays the "OSD transparency setting: VIDEO terminal" setting screen, and performs the later mentioned VIDEO terminal setting processing in FIG. 5. If the function assigned to the assign button is not "OSD transparency setting: VIDEO terminal", the system control unit 109 executes the function assigned to the assign button.

In S209, the system control unit 109 determines whether the user presses the REC button (recording button) of the operation unit 111 (whether the user instructs recording). Processing advances to S210 if the REC button is pressed (if recording is instructed), or to S213 if not pressed.

In S210, the system control unit 109 determines whether the digital video camera 100 is currently recording the moving image (during video recording). Processing advances to S211 if the captured image (moving image) is being recorded to the recording medium 120, or to S212 if not being recorded. In S211, the system control unit 109 ends (stops) recording the moving image. In S212, the system control unit 109 starts recording the moving image to the recording medium 120.

In S213, the system control unit 109 determines whether there is a warning to be notified to the user. Processing advances to S214 if there is a warning to be notified to the user, or to S215 if not. In S214, the system control unit 109 records in the non-volatile memory 113 that there is a warning to be displayed on the OSD. In S215, the system control unit 109 records in the non-volatile memory 113 that there is no warning to be displayed on the OSD.

When the processings in S214 and S215 end, processing returns to S201, and display is performed in accordance with the determination in S202 whether there is a warning to be displayed. The following are examples of the warnings to be notified to the user: memory card (recording medium 120) to record the captured image (still image or moving image) is not installed; residual capacity of the memory card is insufficient; recording cannot be performed due to card error; and image quality will deteriorate or recording cannot be performed due to temperature rise in main camera unit. In other words, many of the warnings have content warning that an image capturing problem will occur (recording of moving image will be stopped). These warnings have content that should be notified to the user with priority, rather than providing good visibility of the LV image (captured image of which recording will be interrupted), hence warnings are not subject to the transparency display that is set by the OSD transparency setting, as mentioned above.

Figure 3:
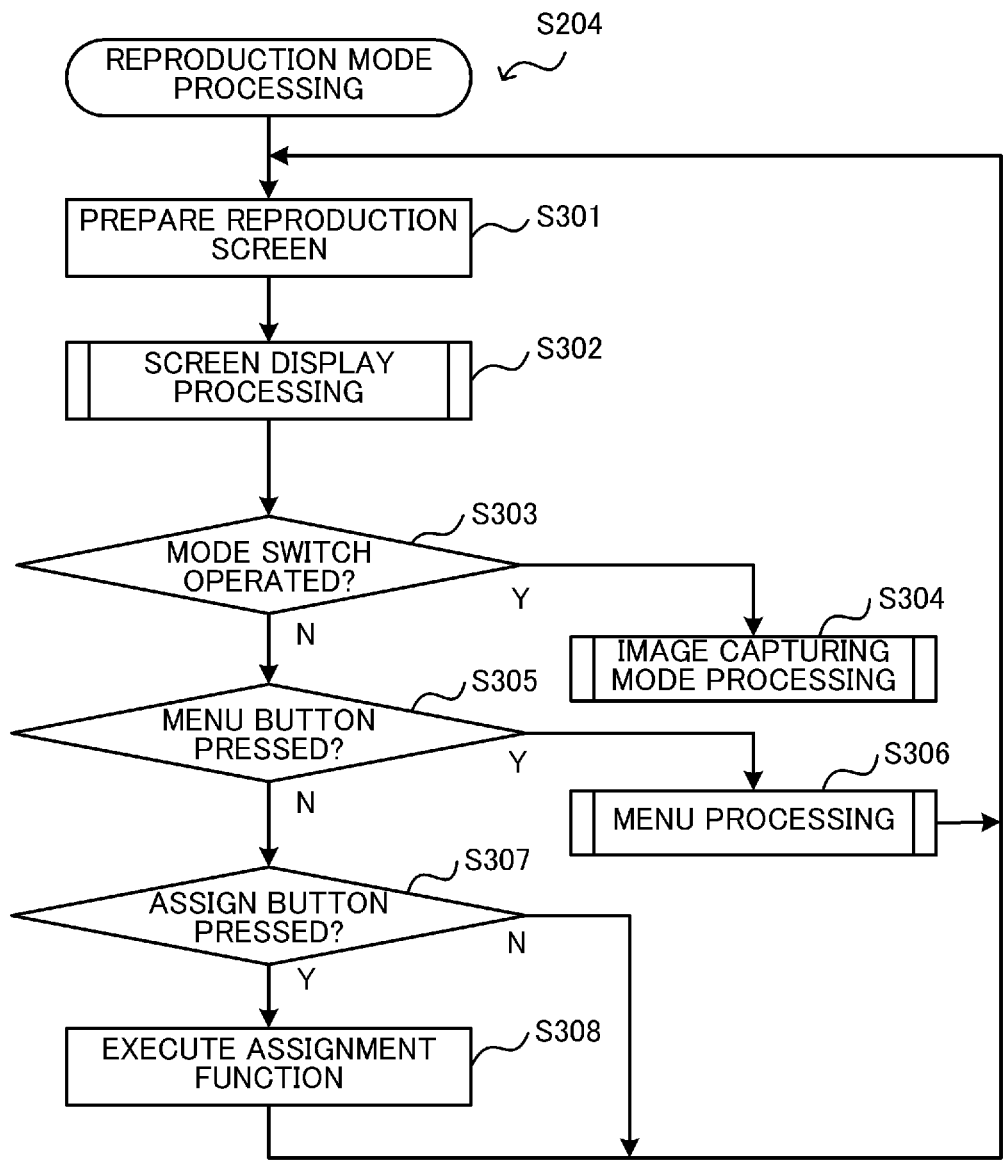
FIG. 3 is a flow chart exemplifying reproduction mode processing of the digital video camera.

Reproduction mode processing FIG. 3 is a flow chart exemplifying the reproduction mode processing of the digital video camera 100. FIG. 3 exemplifies the flow of the processing that is performed in response to the operation received from the user (user operation) in the reproduction mode. Each processing in the flow chart is implemented by the system control unit 109 developing in the system memory 116, a program which is stored in the non-volatile memory 113, and executing the program.

In S301, as a preparation processing step to display the reproduction screen, the system control unit 109 sets all the display elements which are superimposed on the reproduction image and displayed on the display device 121, to the transparency control target in the OSD transparency setting. During image capturing, unless the user recognizes a certain display element immediately, image capturing may be interrupted and image capturing opportunities may be missed, however there is no such concern in the reproduction mode. Therefore in the reproduction mode, priority is assigned to provide good visibility of the LV image, and all the display elements are transparently superimposed and displayed on the LV image at the transparency level which is set by the user in the later mentioned processing in FIG. 6.

In S302, the system control unit 109 executes the screen display processing. The screen display processing will be described in detail later with reference to FIG. 11. In the processing in S302, the system control unit 109 displays one of the screens of FIG. 13A and FIG. 13B on the display devices 121*a* to 121*c*.

Figure 13A:
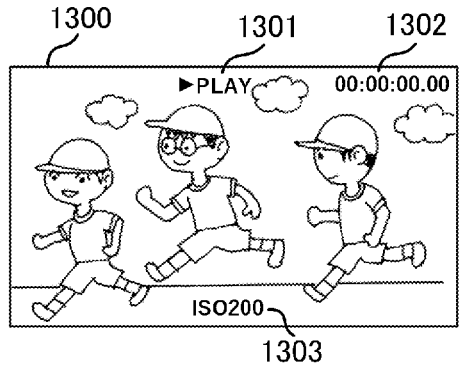
FIG. 13A and FIG. 13B are display examples of a reproduction screen.
Figure 13B:
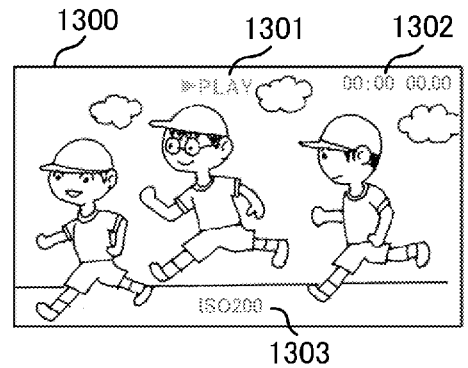

FIG. 13A and FIG. 13B are both display examples of the reproduction screen. FIG. 13A is a display example when the OSD transparency is not applied, and FIG. 13B is a display example when the OSD transparency is applied. In the example of FIG. 13A, display elements of the reproduction state 1301, the time code 1302 and the ISO sensitivity 1303 are displayed on the reproduction screen 1300, so as to be superimposed on the reproduced image (display image generated by reproducing the captured image that was captured by the imaging unit 102 and recorded in the recording medium 120). The reproduction state 1301 is a reproduction icon that indicates whether the current state is the state of reproducing the reproduction target image (moving image) or the state of stopping reproduction. The time code 1302 is displayed as information on the reproducing time of the moving image. The ISO sensitivity 1303 is attribute information recorded in the image file of the reproducing moving image, and indicates the ISO sensitivity which was set when the image was captured. In FIG. 13A, the display elements of the reproduction state 1301, the time code 1302 and the ISO sensitivity 1303 are superimposed and displayed on the reproduced image with no transparency. In FIG. 13B, however, the reproduction state 1301, the time code 1302 and the ISO sensitivity 1303 are all transparently displayed at the transparency level (first transparency level) which is set by the user in the later mentioned processing in FIG. 6. Thereby the user can easily see the reproduced image in FIG. 13B.

In S303, the system control unit 109 determines whether the user operates the mode switch 110. Processing advances to S304 if the mode switch 110 is operated and the mode is changed to the image capturing mode, or to S305 if the mode switch 110 is not operated.

In S304, the system control unit 109 switches the operation state of the digital video camera 100 to the image capturing mode, and executes the image capturing mode processing which was described in reference to FIG. 2.

In S305, the system control unit 109 determines whether the user presses the menu button of the operation unit 111. If the menu button is pressed, the system control unit 109 displays the menu screen on the display device 121, and processing advances to S306. If the menu button is not pressed, the system control unit 109 advances the processing to S307.

In S306, the system control unit 109 executes the menu processing, then returns the processing to S301. The menu processing will be described in detail later with reference to FIG. 4.

In S307, the system control unit 109 determines whether the user presses the assign button which is included in the operation unit 111. Processing advances to S308 if the assign button is pressed, or to S301 if not pressed.

In S308, the system control unit 109 executes the function assigned to the assign button. If the function assigned to the assign button is "OSD transparency setting: VIDEO terminal", the system control unit 109 displays the "OSD transparency setting: VIDEO terminal" setting screen, and performs the later mentioned VIDEO terminal setting processing in FIG. 5. If the function assigned to the assign button is not "OSD transparency setting: VIDEO terminal", the system control unit 109 executes the function assigned to the assign button.

Figure 4:
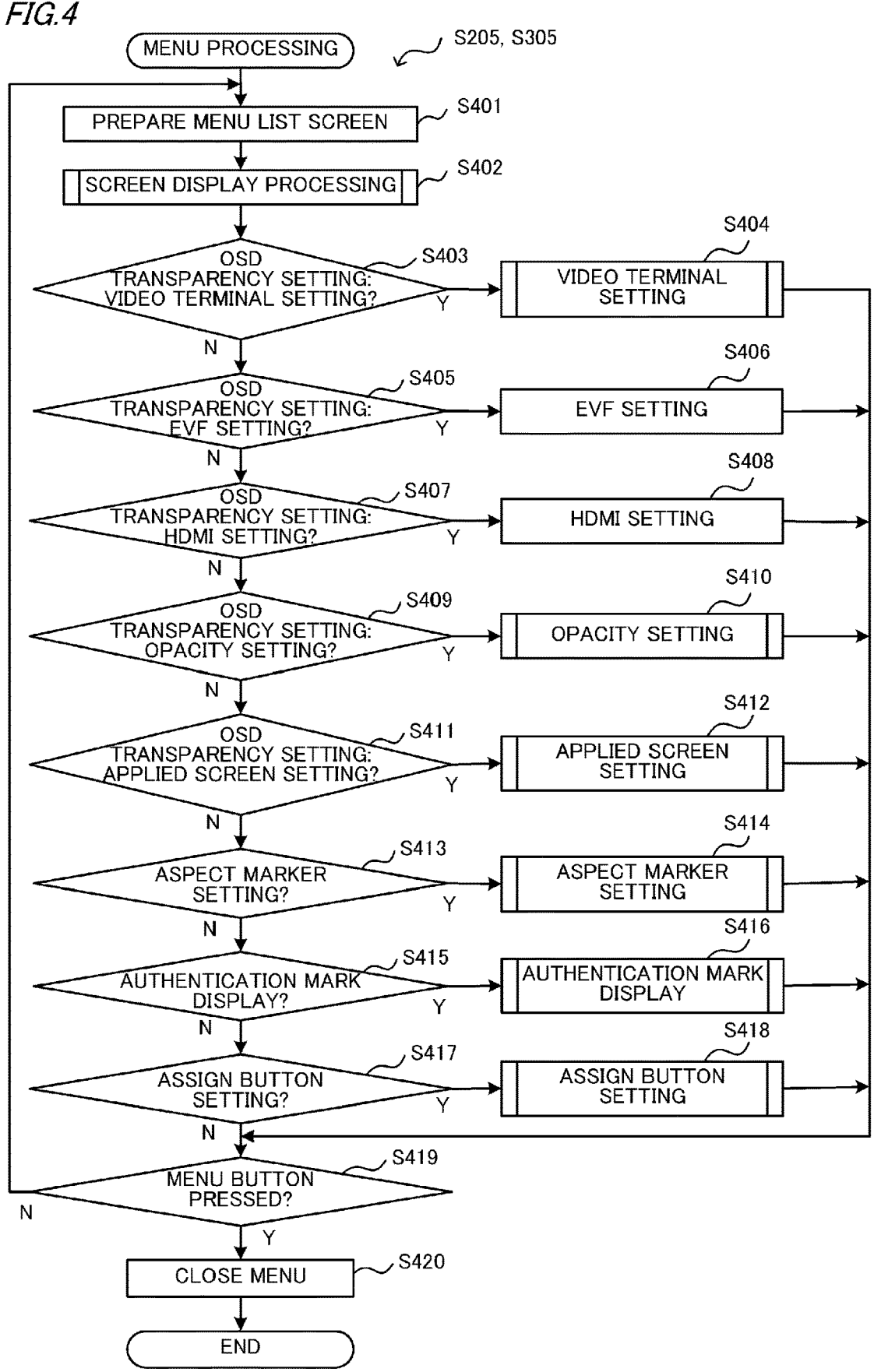
FIG. 4 is a flow chart exemplifying menu processing.

Menu processing FIG. 4 is a flow chart exemplifying the menu processing. The menu processing includes processing to set the transparent display of an element display on the OSD in accordance with the item selected in a menu list screen. The user can select a setting target item by moving the cursor to the setting target item in the menu list screen, and pressing the set key in the operation unit 111.

The setting processing of each item selected in the menu list screen will be described in detail with reference to FIG. 5 to FIG. 10. Each processing in the flow charts in FIG. 4 to FIG. 10 is implemented by the system control unit 109 developing in the system memory 116, a program which is stored in the non-volatile memory 113, and executing the program.

In S401, as a preparation processing step to display the setting screen, the system control unit 109 sets, for each display element displayed on the menu list screen, whether this display element is an OSD transparency control target or not.

In S402, the system control unit 109 executes the screen display processing of the menu list screen. In S402, one of the screens of FIG. 15A and FIG. 15B is displayed on the display device 121.

Figure 15A:
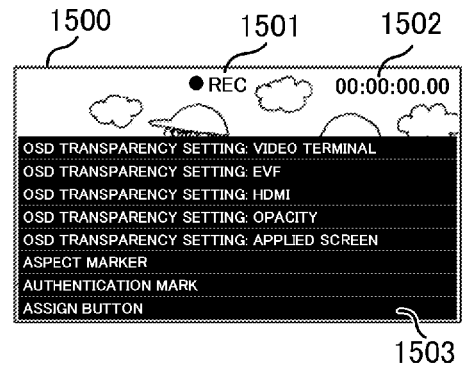
FIG. 15A and FIG. 15B are display examples of a menu list screen.
Figure 15B:
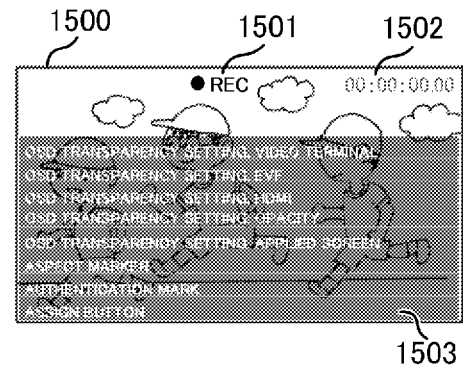

FIG. 15A and FIG. 15B are both display examples of the menu list screen. The menu list screen can be displayed in the image capturing mode and the reproduction mode, but FIG. 15A and FIG. 15B are both examples when the menu list screen is displayed in the image capturing mode. FIG. 15A is a display example when the OSD transparency is not applied, and FIG. 15B is a display example when the OSD transparency is applied. In both of the examples of FIG. 15A and FIG. 15B, the display elements of the recording state 1501, the time code 1502 and the menu list screen 1503 are superimposed and displayed on the LV image. In FIG. 15A, the display elements of the recording state 1501, the time code 1502 and the menu list screen 1503 are superimposed and displayed on the LV image with no transparency. In FIG. 15B, however, the time code 1502 and the menu list screen 1503 are displayed with transparency, but OSD transparency is not applied to the recording state 1501, and the user can see the recording state 1501 easily. Thereby the user can easily see the LV image and perform operation on the menu list screen 1503 while viewing the LV image.

The menu list screens exemplified in FIG. 15A and FIG. 15B include the following setting items as options.
"OSD transparency setting: VIDEO terminal"
"OSD transparency setting: EVF"
"OSD transparency setting: HDMI"
"OSD transparency setting: opacity setting"
"OSD transparency setting: applied screen"
"aspect marker"
"authentication mark"
"assign button"

FIG. 15A and FIG. 15B are examples of the menu list screen, and other menu items (options) can be displayed by scrolling or switching pages. The other menu items include, for example, setting items related to image capturing (e.g. recording image size, frame rate, AF system) and setting items related to reproduction (e.g. image retrieval, attribute information attachment, image delete, edit). The other items also include setting items of the apparatus in general (e.g. date setting, display brightness setting, communication setting, volume setting, initialization). Description on the control in the case of selecting other menu items is omitted.

VIDEO Terminal Setting

In S403, the system control unit 109 determines whether the item "OSD transparency setting: VIDEO terminal" is selected from the menu list. This item is a menu item to set whether the display element on the OSD at the output destination, to which the VIDEO terminal is connected, is transparently displayed at the transparency level set by the user in the later mentioned processing in FIG. 6 (OSD transparency setting). Processing advances to S404 if "OSD transparency setting: VIDEO terminal" is selected, or to S405 if not selected.

Figure 5:
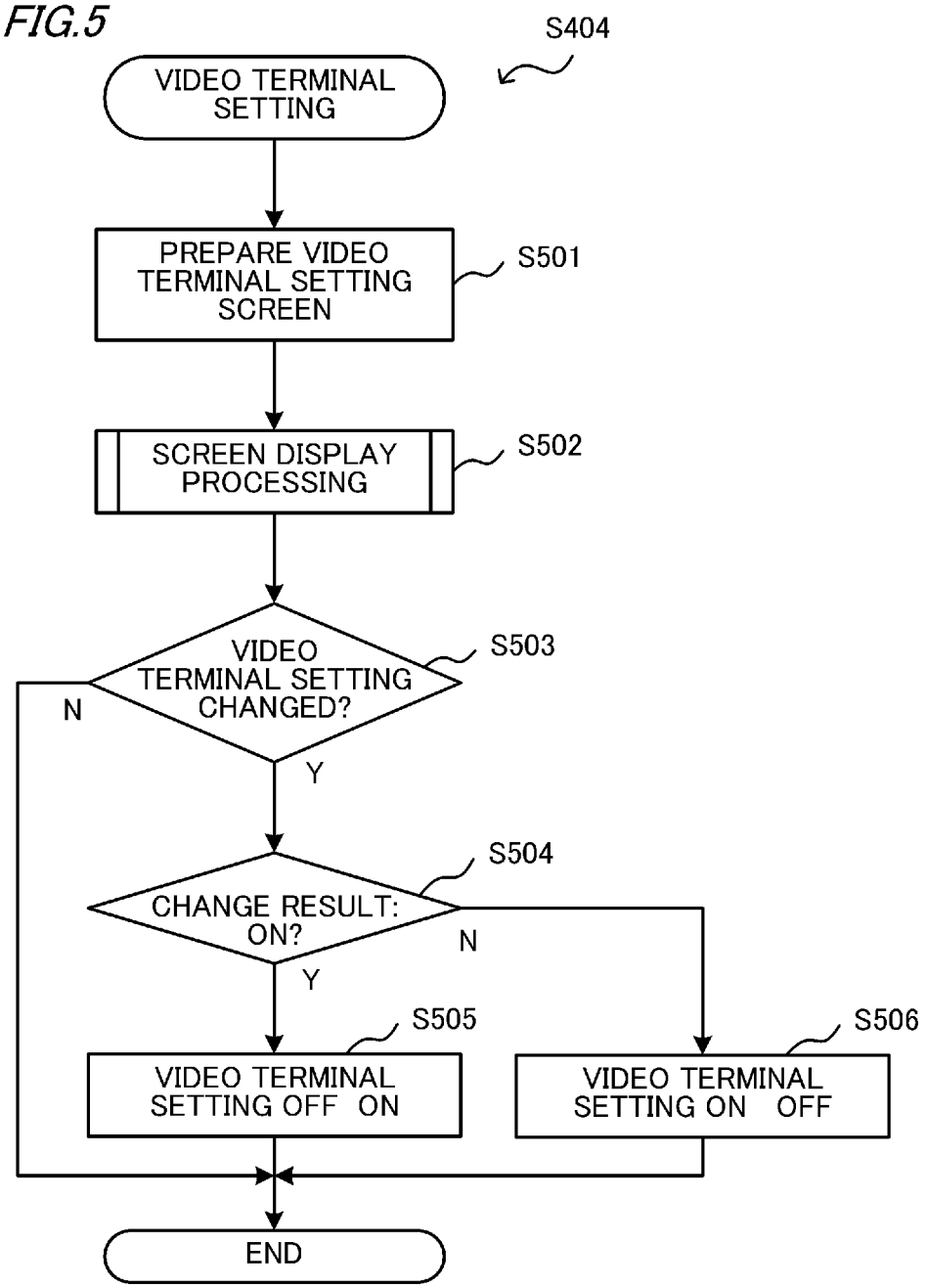
FIG. 5 is a flow chart exemplifying display processing of a VIDEO terminal setting screen.

In S404, the system control unit 109 displays the VIDEO terminal setting screen for the user to set whether the display element on the OSD is transparently displayed at the output destination (display device 121a) to which the VIDEO terminal is connected. FIG. 5 is a flow chart exemplifying the display processing of the VIDEO terminal setting screen.

In S501, as a preparation processing step to display the setting screen, the system control unit 109 sets, for each display element displayed on the VIDEO terminal setting screen, whether this display element is a transparency control target in the OSD transparency setting. The VIDEO terminal setting screen is a part of the hierarchical menu, and is a sub-hierarchical screen of the menu list screen in FIG. 15A or FIG. 15B. In the VIDEO terminal setting screen, the VIDEO terminal setting screen is displayed instead of the menu list screen 1503 in FIG. 15A or FIG. 15B. The VIDEO terminal screen is a transparency control target in the OSD transparency setting. For the other display elements, determination on whether each display element is a transparency control target or not in the OSD transparency setting is the same as the content described in the menu list screen in FIG. 15A or FIG. 15B.

In S503, the system control unit 109 determines whether the setting of the transparent display at the VIDEO terminal connection destination is changed in the VIDEO terminal setting screen. The user can set whether or not the display element is transparently displayed at the VIDEO terminal connection destination by selecting "ON" or "OFF" in the VIDEO terminal setting screen.

Even if the transparent display is set to "ON", the display element that was not set to the transparency control target in S501 is displayed at a transparency level lower than the transparency level set by the user (first transparency level). The phrase "displayed at a transparency level lower than the first transparency level" means that the display element which was not set to the transparency control target is displayed at a transparency level (second transparency level) lower than the first transparency level. The second transparency level includes the transparency level in the case where the transparent display is not performed (transparency level is 0%). If the setting whether or not the transparent display is performed is changed, processing advances to S504, and if the setting is not changed, the processing in FIG. 5 ends, and processing advances to S419 in FIG. 4.

In S504, the system control unit 109 determines whether the change result (setting after change) in S503 is "ON". Processing advances to S505 if the change result is "ON", or to S506 if the change result is "OFF".

In S505, the system control unit 109 changes the transparent display setting at the VIDEO terminal connection destination to "ON", and transparently displays the transparency control target display element on the OSD of the screen displayed in S502. The setting after change ("ON") is recorded in the non-volatile memory 113. As a result, the screen in FIG. 15A is displayed when the processing in FIG. 5 ends and the menu list screen is displayed on the display device 121*a*.

In S506, the system control unit 109 changes the transparent display setting at the VIDEO terminal connection destination to "OFF", and does not transparently display each display element on the OSD of the screen displayed in S502. The setting after change ("OFF") is recorded in the non-volatile memory 113. As a result, the screen in FIG. 15B is displayed when the processing in FIG. 5 ends and the menu list screen is displayed on the display device 121*a*. When the processing in S505 or S506 ends, the system control unit 109 advances the processing to S491 in FIG. 4.

EVF Setting

In S405 in FIG. 4, the system control unit 109 determines whether the item "OSD transparency setting: EVF" is selected from the menu list. This item is a menu item to set whether the display element on the OSD is transparently displayed at the EVF (display device 121*c*). Processing advances to S406 if the "OSD transparency setting: EVF" is selected, or to S407 if not selected.

In S406, the system control unit 109 displays an EVF setting screen for the user to set whether the display element on the OSD is transparently displayed at the EVF. This processing is the same as the processing in S404 and FIG. 5, except that the display destination, for which it is set whether the transparency control is performed or not in the OSD transparency setting, is not the VIDEO terminal connection destination, but is EVF, hence description thereof is omitted. In this way, for each display destination, it can be set whether the display elements on the OSD are transparently displayed. Therefore the most appropriate setting can be performed for each user who views the display destination. For example, in the case where a plurality of cameramen capture video images, as in the case of shooting a movie, the display elements on the OSD at EVF are not set to the transparency control targets in the OSD transparency setting (set to "OFF"), so that a cameraman viewing the EVF can perform their work under the best conditions. At the VIDEO terminal connection destination, on the other hand, the display elements on the OSD are set to the transparency control targets in the OSD transparency setting (set to "ON"), so that the cameraman confirming the video image at the VIDEO terminal destination can confirm the video image optimally.

HDMI Setting

In S407 in FIG. 4, the system control unit 109 determines whether the item "OSD transparency setting: HDMI" is selected from the menu list. This item is a menu item to set whether the display element on the OSD is transparently displayed at the output destination of the HDMI connection (display device 121*b*). Processing advances to S408 if the "OSD transparency setting: HDMI" is elected, or to S409 if not selected.

In S408, the system control unit 109 displays an HDMI setting screen for the user to set whether the display element on the OSD is transparently displayed at the output destination of the HDMI connection. This processing is the same as the processing in S404 and FIG. 5, except that the display destination, for which it is set whether the transparency control is performed or not in the OSD transparency setting, is not the VIDEO terminal connection destination, but is the output destination of the HDMI connection, hence description thereof is omitted.

Opacity Setting

In S409 in FIG. 4, the system control unit 109 determines whether the item "OSD transparency setting: opacity setting" is selected from the menu list. This item is a menu item to set the opacity level of the display element displayed on the OSD. Processing advances to S410 if "OSD transparency setting: opacity setting" is selected, or to S411 if not selected.

Figure 6:
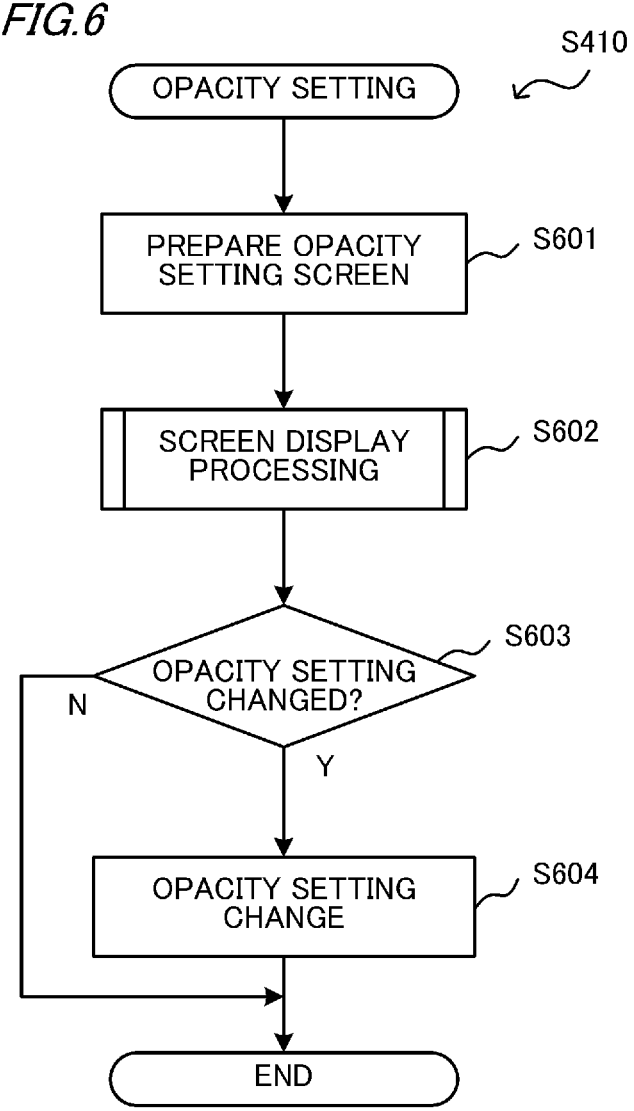
FIG. 6 is a flow chart exemplifying display processing of an opacity setting screen.

In S410, the system control unit 109 displays an opacity setting screen for the user to set the opacity level of the display element displayed on the OSD. FIG. 6 is a flow chart exemplifying the display processing of the opacity setting screen.

In S601, as a preparation processing step to display the setting screen, the system control unit 109 sets, for each display element displayed on the opacity setting screen, whether this display element is a transparency control target in the OSD transparency setting. The opacity setting screen is a part of the hierarchical menu, and is a sub-hierarchical screen of the menu list screen in FIG. 15A or FIG. 15B. In the opacity setting screen, the opacity setting screen is displayed instead of the menu list screen 1503 in FIG. 15A or FIG. 15B. The opacity setting screen is a transparency control target that is set in the OSD transparency setting. For the other display elements, determination on whether each display element is a transparency control target or not in the OSD transparency setting is the same as the content described in the menu list screen in FIG. 15A or FIG. 15B.

In S602, the system control unit 109 executes the screen display processing of the opacity setting screen. The screen display processing will be described in detail later with reference to FIG. 11.

In S603, the system control 109 determines whether setting of the opacity level is changed in the opacity setting screen. In the opacity setting screen, the user can set the opacity level of the display element by selecting from predetermined options, such as "75%", "62.5%", "50%", "37.5%" and "25%". The opacity level may be set by the user inputting a value of the opacity level, instead of selecting from the predetermined options.

FIG. 6 is an example of setting the opacity level. Setting the opacity level translates into setting the transparency level, since the transparency level can be calculated by subtracting the opacity level from 100%. In the example in FIG. 6, the opacity level is set, but the transparency level may be set as well. The transparency level that is set in S603, or the transparency level calculated from the opacity level (in the case where the opacity level is set), corresponds to the first transparency level. If this setting is changed, processing advances to S604, and if the setting is not changed, processing in FIG. 6 ends, and processing advances to S419 in FIG. 4.

In S604, in accordance with the change result of the opacity level which was set in S603, the system control unit 109 changes the opacity level of the display element, which is a transparency control target in the OSD transparency setting, to the opacity level which was set in S603 on the screen displayed in S602. When the opacity level is set for each display element, each display element is drawn at the corresponding opacity level. The setting of the opacity level after change is recorded in the non-volatile memory 113.

Applied Screen Setting

In S411 in FIG. 4, the system control unit 109 determines whether the item "OSD transparency setting: applied screen" is selected from the menu list. This item is a menu item to set an applied screen to apply the transparent display in the OSD transparency setting. Processing advances to S412 if the "OSD transparency setting: applied screen" is selected, or to S413 if not selected.

Figure 7:
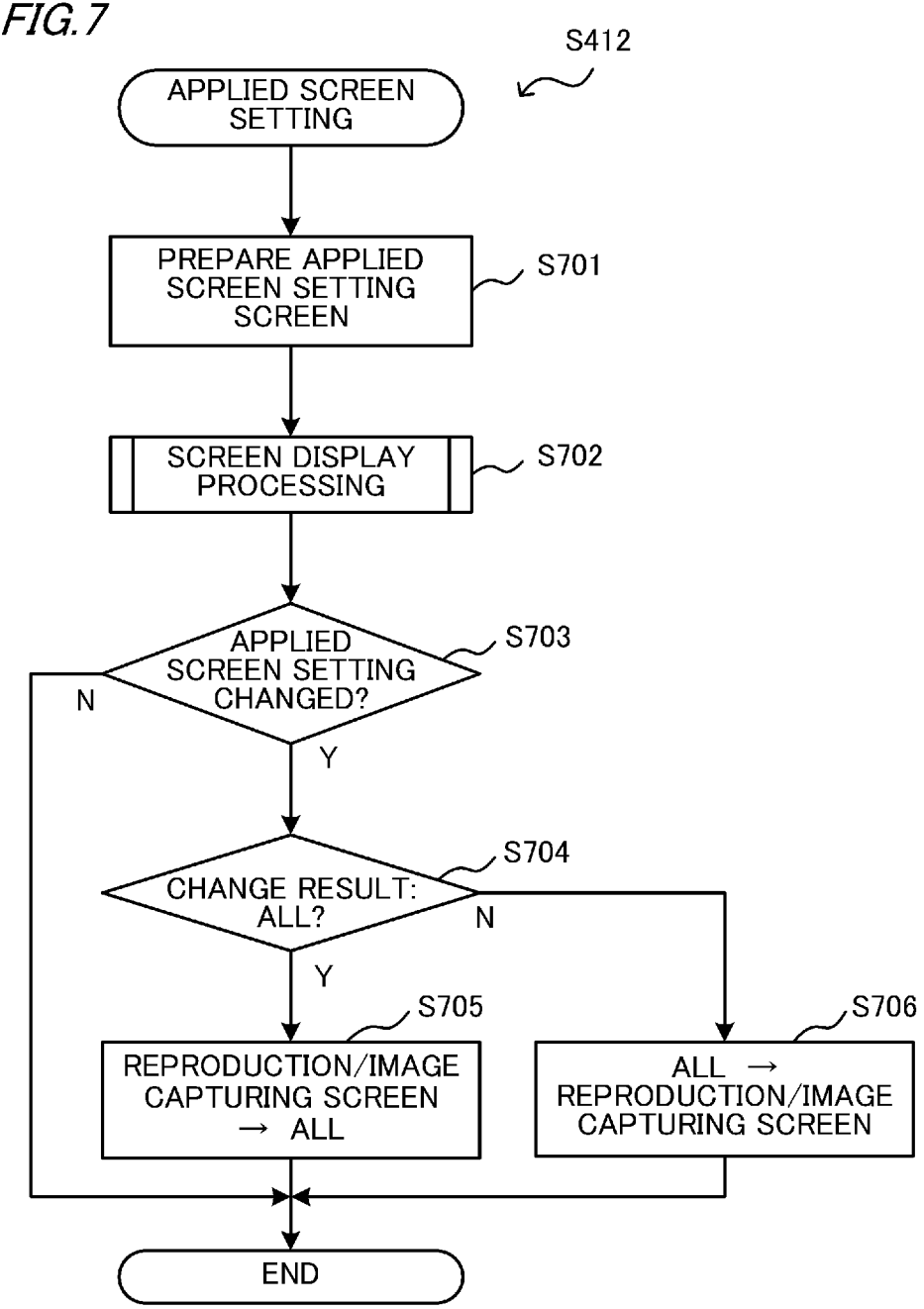
FIG. 7 is a flow chart exemplifying display processing of an applied screen setting screen.

In S412, the system control unit 109 displays an applied screen setting screen for the user to set the applied screen to which the transparent display is applied in the OSD transparency setting. FIG. 7 is a flow chart exemplifying the display processing of the applied screen setting screen.

In S701, as the preparation processing step to display the setting screen, just like S501 in FIG. 5, the system control unit 109 sets, for each display element displayed on the applied screen setting screen, whether this display element is a transparency control target in the OSD transparency setting. The applied screen setting screen is a part of the hierarchical menu, and is a sub-hierarchical screen of the menu list screen in FIG. 15A or FIG. 15B. In the applied screen setting screen, the applied screen setting is displayed instead of the menu list screen 1503 in FIG. 15A or FIG. 15B. The applied screen setting screen is a transparency control target in the OSD transparency setting. For the other display elements, determination on whether each display element is a transparency control target or not in the OSD transparency setting is the same as the content described in the menu list screen in FIG. 15A or FIG. 15B. In S702, the system control unit 109 executes the screen display processing of the applied screen setting screen. The screen display processing will be described in detail later with reference to FIG. 11.

In S703, the system control unit 109 determines whether the setting of the applied screen is changed in the applied screen setting screen. In the applied screen setting screen, the user can set the applied screen to which the transparent display is applied by selecting "all" or "reproduction/image capturing screen" in the options. If "all" is selected, the system control unit 109 applied the transparency display to all the screens. If "reproduction/image capturing screen" is selected, the systems control unit 109 applies the transparency display to the reproduction mode screen and the image capturing mode screen, and does not apply the transparency display to the other screens, such as the menu screen. The setting of the applied screen is not limited to this, and may be configured so that the user can set whether the transparency display is applied or not for each screen. If the setting of the applied screen is changed, processing advances to S604, and if the setting is not changed, the processing in FIG. 7 ends, and processing advances to S419 in FIG. 4.

In S704, the system control unit 109 determines whether the change result (setting after change) in S704 is "all". Processing advances to S705 if the change result is "all", or to S706 if the change result it "reproduction/image capturing screen".

In S705, the system control unit 109 changes the setting of the applied screen to be the target of the transparent display to "all", and reflects the change result on the screen displayed in S702. For example, in the case where the setting of the applied screen is changed from "reproduction/image capturing screen" to "all" while the menu screen is displayed, the menu screen is changed from the non-transparent display state to the transparent display state. The setting after the change "all" is recorded in the non-volatile memory 113.

In S706, the system control unit 109 changes the setting of the applied screen to which the transparent display is performed to "reproduction/image capturing screen", and reflects the change result on the screen displayed in S702. For example, in the case where the setting of the applied screen is changed from "all" to "reproduction/image capturing screen" while the menu screen is displayed, the menu screen is changed from the state of transparent display to the state of non-transparent display. The setting after the change ("reproduction/image capturing screen") is recorded in the non-volatile memory 113. When the processing in S705 or S706 ends, the system control unit 109 advances processing to S419 in FIG. 4.

Aspect Marker Setting

In S413 in FIG. 4, the system control unit 109 determines whether the item "aspect marker" is selected from the menu list. This item is a menu item to set an attribute of the aspect marker. Processing advances to S414 if "aspect marker" is selected, or to S415 if not selected.

Figure 8:
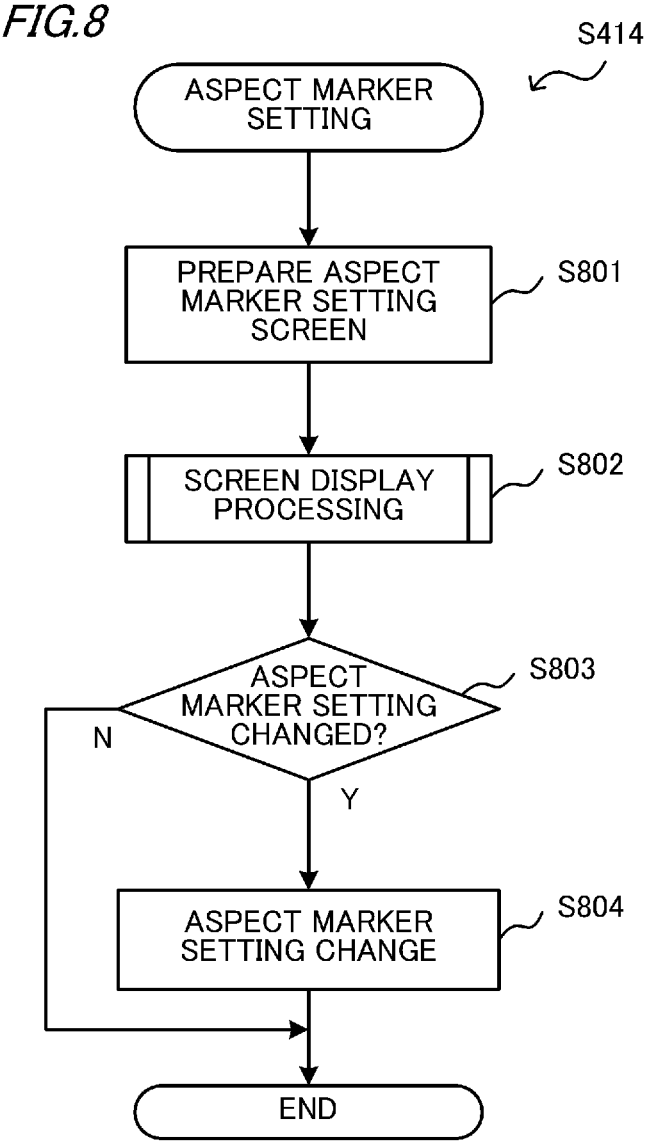
FIG. 8 is a flow chart exemplifying display processing of an aspect marker setting screen.

In S414, the system control unit 109 displays an aspect marker setting screen for the user to set the attribute of the aspect marker. FIG. 8 is a flow chart exemplifying the display processing of the aspect marker setting screen.

In S801, as a preparation processing step to display the setting screen, just like S501 ion FIG. 5, the system control unit 109 sets, for each display element displayed on the aspect marker setting screen, whether this display element is a transparency control target or not in the OSD transparency setting. The aspect marker setting screen is a part of the hierarchical menu, and is a sub-hierarchical screen of the menu list screen in FIG. 15A or FIG. 15B. In the aspect marker setting screen, the aspect marker setting screen is displayed instead of the menu list screen 1503 in FIG. 15A or FIG. 15B. The aspect marker setting screen is a transparency control target in the OSD transparency setting. For the other display elements, determination on whether each display element is a transparency control target or not in the OSD transparency setting is the same as the content described in the menu list screen in FIG. 15A or FIG. 15B. In S802, the system control unit 109 executes the screen display processing of the aspect marker setting screen. The screen display processing will be described in detail later with reference to FIG. 11.

In S803, the system control unit 109 determines whether the setting is changed in the aspect marker setting screen. In the aspect marker setting screen, the user can set whether the aspect marker is displayed or not, the aspect ratio (e.g. 4:3; 16:9), the color, the display format (line, mask), and the transparency level in the case of a mask display, for example. If the setting of the aspect marker is changed, processing advances to S804, and if the setting is not changed, processing in FIG. 8 end, and processing advances to S419 in FIG. 4.

In S804, the system control unit 109 changes the attribute of the aspect marker on the screen displayed in S803 in accordance with the change result in S803. The setting after the change of the aspect marker is recorded in the non-volatile memory 113, and is reflected on the mask 1205 of the aspect marker on the image capturing screen.

Authentication Mark Display

Figure 9:
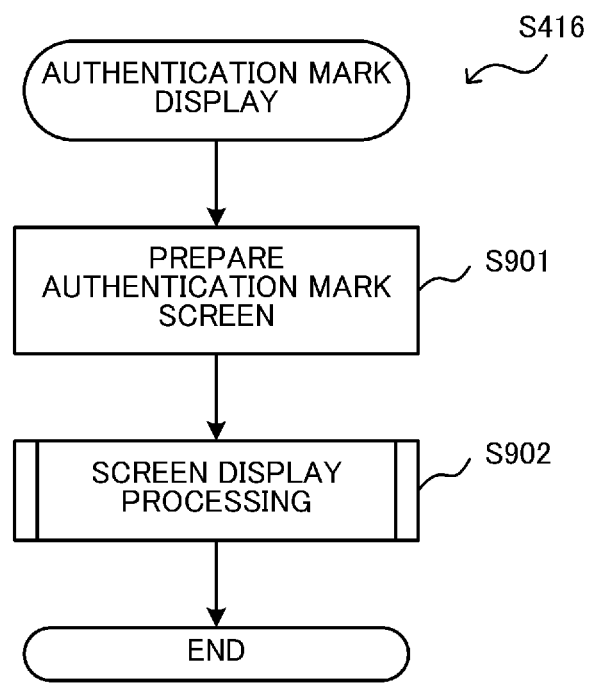
FIG. 9 is a flow chart exemplifying display processing of an authentication mark screen.

In S415 in FIG. 4, the system control unit 109 determines whether the item "authentication mark" is selected from the menu list. This item is a menu item to display an authentication mark screen. Processing advances to S416 if the "authentication mark" is selected, or to S417 if not selected. In S416, the system control unit 109 displays an authentication mark screen. FIG. 9 is a flow chart exemplifying the display processing of the authentication mark screen.

In S901, as the preparation processing step to display the setting screen, just like S501 in FIG. 5, the system control unit 109 sets, for each display element displayed on the authentication mark screen, whether this display element is the transparency control target or not in the OSD transparency setting. The authentication mark screen is a part of the hierarchical menu, and is a sub-hierarchical screen of the menu list screen in FIG. 15A or FIG. 15B. In the authentication mark screen, the authentication mark screen is displayed instead of the menu list screen 1503 in FIG. 15A or FIG. 15B. The authentication mark screen, however, is not the transparency control target in the OSD transparency setting, unlike the menu list screen 1503. For the other display elements, determination on whether each display element is a transparency control target or not in the OSD transparency setting is the same as the content described in the menu list screen in FIG. 15A or FIG. 15B.

In S902, the system control unit 109 executes the display processing of the authentication mark screen, and advances processing to S419 in FIG. 4. The screen display processing will be described in detail later with reference to FIG. 11. In S902, the screen in FIG. 14A or FIG. 14B is displayed on the display device 121.

Figure 14A:
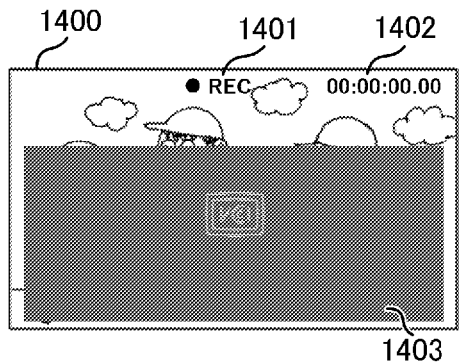
FIG. 14A and FIG. 14B are display examples of an authentication mark screen.
Figure 14B:
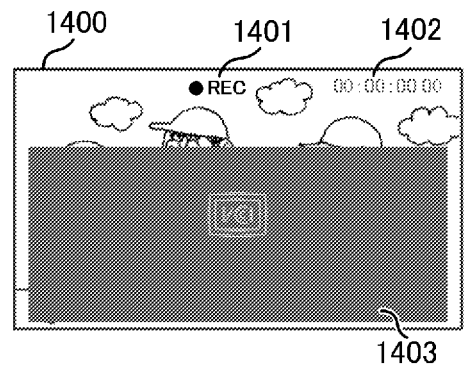

FIG. 14A and FIG. 14B are display examples of the authentication mark screen. FIG. 14A is a display example when the OSD transparency is not applied, and FIG. 14B is a display example when the OSD transparency is applied. In both of the examples in FIG. 14A and FIG. 14B, the display elements of the recording state 1401, the time code 1402 and the authentication mark 1403 are displayed on the authentication mark screen 1400. In FIG. 14A, the display elements of the recording state 1401, the time code 1402 and the authentication mark 1403 are superimposed and displayed on the LV image with no transparency. In FIG. 14B, however, the time code 1402 is transparently displayed, but OSD transparency is not applied to the recording state 1401 and the authentication mark 1403, so that the user can easily see these display elements. Thereby a recognition error by the user is prevented, and the display elements can be displayed independently.

Assign Button Setting

Figure 10:
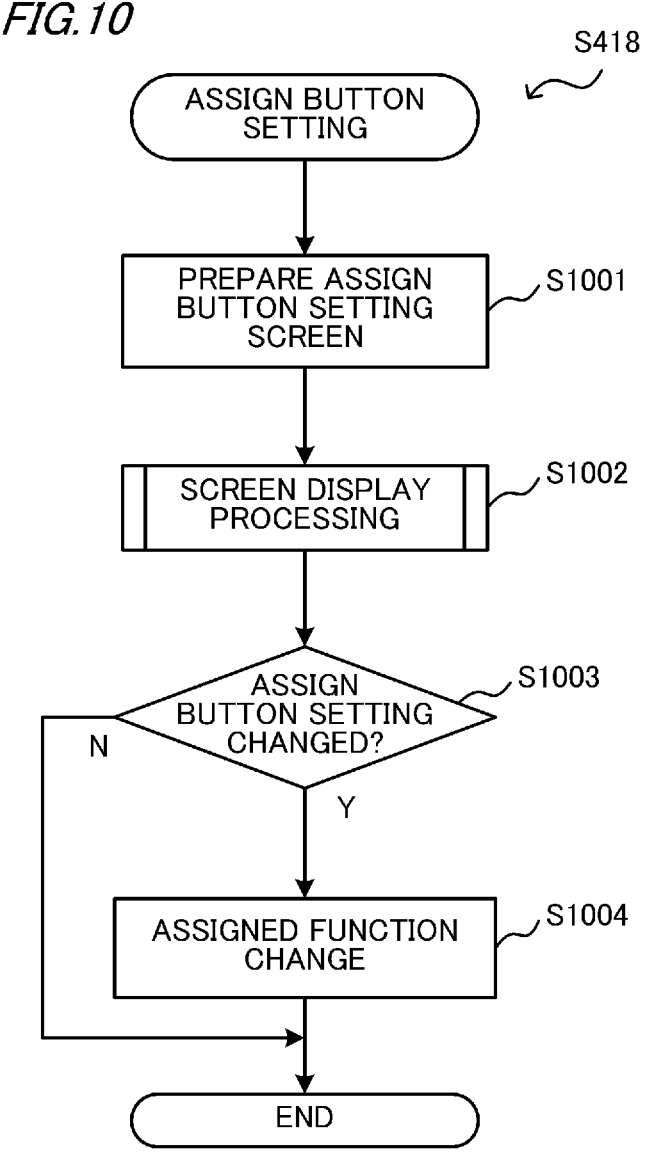
FIG. 10 is a flow chart exemplifying display processing of an assign button setting screen.

In S417 in FIG. 4, the system control unit 109 determines whether the item "assign button" is selected from the menu list. This item is a menu item to set a function assigned to the assign button. Processing advances to S418 if the "assign button" is selected, or to S419 if not selected. In S418, the system control unit 109 displays an assign button setting screen. FIG. 10 is a flow chart exemplifying the display processing of the assign button setting screen.

In S1001, as the preparation processing step to display the setting screen, just like S501 in FIG. 5, the system control unit 109 sets, for each display element displayed on the assign button setting screen, whether this display element is the transparency control target or not in the OSD transparency setting. The assign button setting screen is a part of the hierarchical menu, and is a sub-hierarchical screen of the menu list screen in FIG. 15A or FIG. 15B. In the assign setting screen, the assign button setting screen is displayed instead of the menu list screen 1503 in FIG. 15A or FIG. 15B. The assign button setting screen is a transparency control target in the OSD transparency setting. For the other display elements, determination on whether each display element is a transparency control target or not in the OSD transparency setting is the same as the content described in the menu list screen in FIG. 15A or FIG. 15B. In S1002, the system control unit 109 executes the screen display processing on the assign button setting screen. The screen display processing will be described in detail later with reference to FIG. 11.

In S1003, the system control unit 109 determines whether the setting is changed in the assign button setting screen. In the assign button setting screen, the user can assign a function selected from the predetermined functions to the assign button. Processing advances to S1004 if the setting of the function assigned to the assign button is changed, or to S419 in FIG. 4 if the setting is not changed.

In S1004, the system control unit 109 changes the function assigned to the assign button of the operation unit 111 to the function which the user assigned in the assign button setting screen. For example, the user can assign a function to display the VIDEO terminal setting screen to the assign button. In this case, in S208 in FIG. 2 and S308 in FIG. 3, the system control unit 109 can change whether or not the OSD image, which is outputted to the display device 121 connected to the VIDEO terminal, is transparently displayed. For the opacity level of the display element that is transparently displayed, the opacity level which was set in S603 in FIG. 6 is used.

To the assign button, the function, to switch whether or not each display element is transparently displayed at the output destination where the VIDEO terminal is connected, may be set, instead of the function to display the VIDEO terminal setting screen. In this case, the user can switch whether or not the transparent display is performed at the output destination where the VIDEO terminal is connected, each time the assign button is pressed. After the assigned function is changed, the system control unit 109 advances processing to S419 in FIG. 4.

In S419 in FIG. 4, the system control unit 109 determines whether the user presses the menu button of the operation unit 111. If the menu button is pressed, processing advances to S420, and if the menu button is not pressed, processing returns to S401, and the processing steps are repeated. In S420, the system control unit 109 closes the menu screen, and the menu processing ends.

Screen display processing FIG. 11 is a flow chart exemplifying the screen display processing. The system control unit 109 executes the screen display processing in FIG. 11 as the display control unit. In S1101, the system control unit 109 acquires the OSD transparency setting from the non-volatile memory 113. The OSD transparency setting includes the above mentioned setting of the "OSD transparency setting: VIDEO terminal", the "OSD transparency setting: EVF", the "OSD transparency SETTING: HDMI®", the "OSD transparency setting: opacity setting", and the "OSD transparency setting: applied screen".

In S1102, the system control unit 109 determines whether the setting of the transparent display at the output destination is "ON" or "OFF based on the setting of the "OSD transparency setting: VIDEO terminal", the "OSD transparency setting: EVF", and the "OSD transparency setting: HDMI". The system control unit 109 advances processing to S1103 if the setting of the transparent display at the output destination is "ON", or to S1104 if this setting is "OFF".

In S1103, the system control unit 109 determines whether the setting of the "OSD transparency setting: applied screen" is "image capturing/reproduction screen" or "all". The system control unit 109 advances processing to S1105 if the "image capturing/reproduction screen" is set, or to S1106 if "all" is set.

In S1104, the system control unit 109 draws all the display elements on the OSD without using the opacity level (first transparency level) that is set in S603 in FIG. 6. In other words, all the display elements are superimposed and displayed on the image to be superimposed with no transparency, or transparently at a second transparency level which is lower (darker) than the first transparency level.

In S1105, the system control unit 109 determines whether the image capturing screen/reproduction screen is currently displayed or not. Processing advances to S1106 if the image capturing screen/reproduction screen is currently displayed, or to S1104 if a screen other than the image capturing screen/reproduction screen is currently displayed.

In S1106, for one of a plurality of display elements displayed on the screen, the system control unit 109 determines whether this display element is a transparency control target in the OSD transparency setting. Whether each display element is a transparency control target or not is set in the screen preparation processing (e.g. S501) which is executed before the screen display processing indicated in FIG. 11. Processing advances to S1107 if the display element is a transparency control target, or to S1108 if not a transparency control target.

In S1107, the system control unit 109 controls so that the OSD drawing unit 118 draws the display element transparently at the opacity level that is set in S603 in FIG. 6. In S1108, the system control unit 109 controls so that the OSD drawing unit 118 draws a display element with no transparency, or at a transparency level lower than the opacity level that is set in S603 in FIG. 6 (first transparency level).

In S1109, the system control unit 109 determines whether drawing processing completed for all the display elements displayed on the screen. If the drawing processing completed for all the display elements, processing advances to S1110, and if not completed, processing returns to S1106, and drawing processing is performed for the next display element out of the plurality of display elements. The system control unit 109 executes the processing steps in S1106 to S1108 for each of the display elements which are not yet drawn.

In S1110, the system control unit 109 generates an image to be superimposed. The image to be superimposed is an LV image if the mode is the image capturing mode, and the reproduced image if the mode is the reproduction mode. In S1111, the system control unit 109 outputs a combined display image, generated by superimposing the OSD image on the image to be superimposed generated in S1110, to the display device 121, and ends the screen display processing. The system control unit 109 performs the above processing for each output destination.

The various control steps described above are performed by the system control unit 109, but may be performed by one hardware, or may be shared by a plurality of hardware (e.g. a plurality of processors and circuits) which share the processing to control the entire apparatus.

The present invention has been described with reference to the preferred embodiments, but the present invention is not limited to these specific embodiments, but includes various modes within the scope not departing from the essence of the invention. Each of the above mentioned embodiments is merely an example of the present invention, and each embodiment may be appropriately combined.

In the above mentioned embodiment, a case where the present invention is applied to the digital video camera 100 was described as an example, but the imaging control apparatus according to the present invention is not limited to this example, but is applicable to any imaging control apparatus which has a function to superimpose and display various information as an OSD. In other words, the present invention is applicable to a personal computer, a PDA, a portable telephone terminal, a portable image viewer and other apparatuses equipped with a display, such as a printer, digital photo frame, music player, game machine and electronic book reader.

The present invention is applicable not only to a camera main unit, but also to a control apparatus which communicates with a camera (including a network camera) wirelessly or via cable, and controls the camera remotely. Examples of the apparatus that controls a camera remotely are a smartphone, a table PC and a desktop PC. The camera can be remotely controlled by the control apparatus notifying a command to cause the camera to perform various operations and settings based on the operation performed on the control apparatus side or the processing performed on the control apparatus side. The live view image captured by the camera may be received wirelessly or via cable and displayed on the control apparatus side.

According to the present invention, when display elements are transparently displayed, the visibility of a display element, which should be seen clearly, can be maintained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-152835, filed on Aug. 23, 2019, which is hereby incorporated by reference herein in its entirety.

What is claimed is:

1. An imaging control apparatus, comprising:
at least one memory and at least one processor which function as:
a setting unit configured to set, in accordance with user operation, whether transparent display at a first transparency level is performed for a display element that is superimposed and displayed on a captured image captured by an imaging unit;
a display control unit configured to superimpose and display a plurality of display elements including a specific display element on the captured image, and to control so that in a case where the setting unit sets the transparent display to be performed, the plurality of display elements other than the specific display element are transparently superimposed and displayed on the captured image at the first transparency level, and the specific display element is superimposed and displayed on the captured image at a second transparency level lower than the first transparency level.

2. The imaging control apparatus according to claim 1, wherein the specific display element is at least one of a mask of the captured image, an icon to indicate a recording state of the captured image, a warning display, and an authentication mark.

3. The imaging control apparatus according to claim 1, wherein the display control unit controls so that, in a case where the setting unit sets the transparent display not to performed, the plurality of display elements other than the specific display element are also superimposed and displayed on the captured image without allowing the transparent display.

4. The imaging control apparatus according to claim 1, wherein the display control unit controls so that an image generated by superimposing and displaying the display elements on the captured image is displayed on at least one of a display device connected via a VIDEO terminal, an electronic view finder and a display device connected via HDMI.

5. The imaging control apparatus according to claim 1, wherein the setting unit is capable of setting whether the transparent display is performed for each of a plurality of output destinations of an image.

6. The imaging control apparatus according to claim 1, wherein the captured image is a live view image.

7. The imaging control apparatus according to claim 1, wherein the display control unit so that, in a reproduction screen on which an image captured by the imaging unit is reproduced and displayed, all the display elements to be superimposed and displayed on the image are transparently superimposed and displayed on the image at the first transparency level which is set by the setting unit.

8. The imaging control apparatus according to claim 1, wherein the display control unit controls so that in the case where the setting unit sets the transparent display to performed, the plurality of display elements other than the specific display element are displayed at the first transparency level when a first screen is displayed, and the plurality of display elements are displayed at the second transparency level when a second screen is displayed.

9. The imaging control apparatus according to claim 8, wherein at least one of an image capturing screen, a menu screen and a reproduction screen is capable of being set as the first screen in accordance with user operation, and the second screen is a screen that is not set as the first screen.

10. The imaging control apparatus according to claim 1, wherein the setting unit is further capable of setting one of a plurality of transparency levels as the first transparency level that is used for the transparent display.

11. The imaging control apparatus according to claim 1, further comprising the imaging unit.

12. The imaging control apparatus according to claim 1, further comprising an instruction unit configured to instruct recording of an image captured by the imaging unit.

13. A method of controlling an imaging control apparatus, the method comprising:
a setting step of setting, in accordance with user operation, a first transparency level of a display element that is superimposed and displayed on a captured image captured by an imaging unit; and
a display control step of superimposing and displaying a plurality of display elements including a specific display element on the captured image, and controlling so that the plurality of display elements other than the specific display element are transparently superimposed and displayed on the captured image at the first transparency level, and the specific display element is superimposed and displayed on the captured image at a second transparency level lower than the first transparency level.

14. A non-transitory computer readable storage medium that stores a program, wherein the program causes a computer to execute:
a setting step of setting, in accordance with user operation, a first transparency level of a display element that is superimposed and displayed on a captured image captured by an imaging unit; and
a display control step of superimposing and displaying a plurality of display elements including a specific display element on the captured image, and controlling so that the plurality of display elements other than the specific display element, are transparently superimposed and displayed on the captured image at the first transparency level, and the specific display element is superimposed and displayed on the captured image at a second transparency level lower than the first transparency level.

* * * * *